Nov. 18, 1941.   R. L. SMIRL   2,263,107

VEHICLE SPRING SUSPENSION

Filed Oct. 9, 1939

Inventor:
Richard L. Smirl
By: Edward C. Gritzbaugh
Atty.

Patented Nov. 18, 1941

2,263,107

UNITED STATES PATENT OFFICE 2,263,107

VEHICLE SPRING SUSPENSION

Richard L. Smirl, Bellwood, Ill., assignor to Borg-Warner Corporation, Chicago, Ill., a corporation of Illinois Application October 9, 1939, Serial No. 298,544

6 Claims. (Cl. 267—2)

This invention relates to the springing of land vehicles particularly of the automotive type, and has as its general object to provide a unitary spring assembly having a deflection characteristic adapted to utilize a very low rate of deflection in the range of normal wheel displacements. A deflection characteristic involving a rate that is very low at the normal wheel position and increases with displacement in either direction from this position will transmit a minimum of energy to the vehicle during normal wheel displacements and yet provided the required resistance to "bottoming" during displacements greater than the range of action of the suspension members relative to the vehicle. It is necessary to transmit sufficient energy to the vehicle during the time of the abnormal wheel displacement to have moved the vehicle the required additional distance before the limit of travel is reached—otherwise there will be a severe impact as the suspension members strike the limit pads on the vehicle frame.

In conventional constant rate springs, the quality of the normal ride is compromised by keeping the spring rate sufficiently high to avoid bottoming, whereas with the spring unit disclosed herein a much lower rate in the range of normal wheel displacement can be used with the same or greater resistance at the limit of travel, and without increasing the total range of travel of the suspension members. The invention also aims to accomplish this result without increasing the amount of material required for the spring, in spite of the lower rate obtained, and aims to provide a unit requiring even less space than those in present use.

Other objects, the advantages and uses of my invention will become more apparent from a reading of the following specification taken in connection with the appended drawing which forms a part thereof and wherein.

Figure 1:
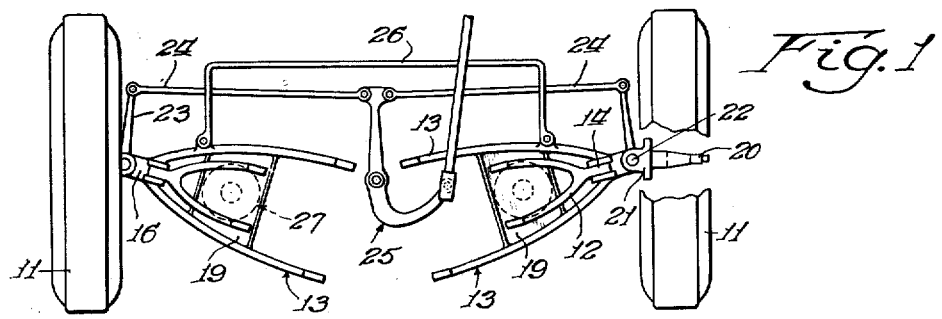
Fig. 1 is a plan view of a vehicle spring suspension embodying the invention.
Figure 2:
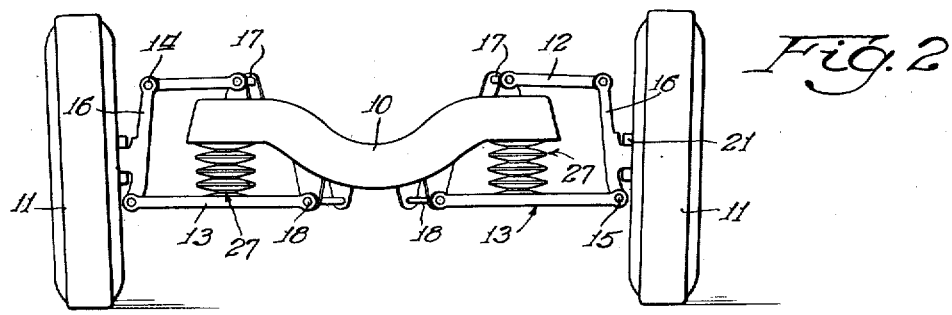
Fig. 2 is a front elevation thereof.

As an example of one form in which the invention may be embodied, I have shown in Fig. 1, a conventional vehicle spring suspension for transferring the load of a vehicle from the frame 10 thereof to the road wheels 11 thereof. Such a suspension may include pairs of parallel arms 12 and 13, pivoted at 14 and 15 respectively to the upper and lower ends of the bracket 16 of the front wheel steering knuckle assembly, and, at their other ends, pivoted as at 17 and 18 respectively to the upper and lower sides of the cross frame member 10.

My improved spring device 27 may be interposed in place of the conventional coil spring between each end of the cross frame member 10 and the lower arms 13, its upper end being seated in the end of the cross frame member and its lower end being engaged against a seat 19 integrally connecting the spaced side portions of the arm 13, which is of wishbone shape as shown.

The wheels 11 may be connected to the bracket 16 by means of the conventional front wheel spindles 20, steering knuckles 21, and king pin 22. A conventional steering mechanism is shown in Fig. 1, including the steering arms 23, the tie rods 24, and the steering lever mechanism 25. The arms 13 may be connected by a conventional sway eliminator 26.

My improved spring device 27 comprises a plurality of curved section conical washer-type springs 28 having characteristics similar to those disclosed in the pending application, Serial No. 292,776 of myself and Harold Nutt, for Springs. The spring elements of the present invention are designed to have a positive rate throughout their entire range of deflection.

Briefly reviewing the characteristics of a spring of this type, each spring element is in the form of an annulus formed from flat material into a dished shape, roughly conical but curved in radial cross-section with its inner and outer peripheries lying in planes axially spaced from each other. The crown, i. e., the amount of curvature, may be somewhat more in proportion to the other characteristics than is set forth in the specific examples of the application above referred to, whereby a more positive rate is secured.

The spring elements 28 are associated together in pairs of elements that are arranged back to back with their inner peripheries in thrust transmitting association with each other through the medium of washers 30 having shoulders 31 received within the central openings of the respective spring elements. Adjacent pairs of spring elements are associated together with their outer peripheries in thrust transmitting association through the medium of washers 32 having shoulders or lugs 33 embracing the respective peripheries.

Figure 3:
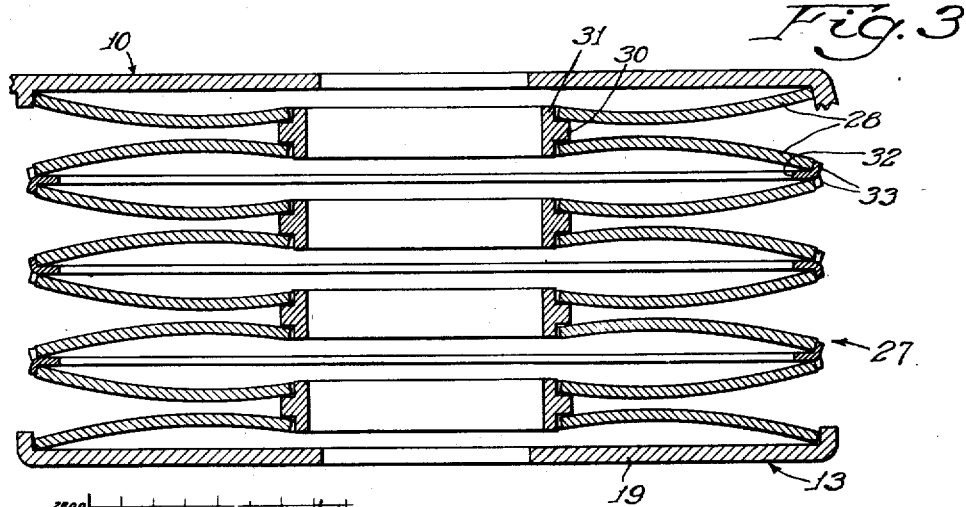
Fig. 3 is a detailed sectional view of the spring.
Figure 4:
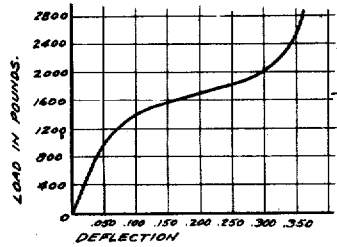
Fig. 4 is a chart showing the deflection curve of one element of the spring.

A deflection curve of one of the spring elements is shown in Fig. 4. At an optimum wheel position, which provides somewhat more travel for compression displacement than for extension displacements, a load of approximately 1600 pounds is developed. For a typical wheel load of 800 pounds a two to one lever ratio between the wheel and the spring unit may be provided by placing the spring seat 19 at the proper point along the arm 13. A spring unit comprising seven pairs of elements approximately 6 inches in diameter and .095 inch thick, arranged as in Fig. 3 has a total useful deflection of 4.5 inches giving 9 inches total available travel at the wheel. Such a unit has a length of slightly less than 5 inches at the normal static wheel load, and it compresses to a length of approximately 2.5 inches at the limit of its travel—making it considerably more compact than any spring unit in present use. The compactness is largely due to the high unit resilience of the curved section annular spring element disclosed in the pending application mentioned above.

A similar deflection curve may be obtained with a conical disc spring element or a radially tapered spring element by using considerably more material.

The damping action of the unit due to inter-element friction at the spacers 30 and 32 may be controlled by using different materials for these spacers. Such control is a desirable factor, although the dynamic type of damping provided by conventional "shock absorbers" may desirably be retained in order to secure the best results.

The spring device of my invention requires no major change in any suspension system which is capable of handling the horizontal forces and wheel torques; it can be manufactured as cheaply as existing units serving in the same capacity or more cheaply than those which also carry some of the horizontal forces and torques. Its net effect in providing a gradually varying resistance to displacements of various magnitudes is an improvement that cannot be obtained with a constant rate unit or even with a combination of a reasonable number of constant rate units having different rates and ranges of action.

I claim:

1. In a land vehicle spring suspension, in combination with means for receiving the load of a vehicle and means for transmitting such load to the vehicle wheels, spring mechanism interposed between said means, said spring mechanism having a load capacity so related to the dead weight of the vehicle that the spring mechanism will be preloaded, at normal wheel position, to a stage of deflection within the low rate range of said spring elements whereby to provide a softly cushioned ride over surfaces that are slightly rough, coupled with stiffened resistance to wheel deflection in traveling over larger obstructions.

2. In a land vehicle spring suspension, in combination with means for receiving the load of a vehicle and means for transmitting such load to the vehicle wheels, spring mechanism interposed between said means, comprising a plurality of washer-type spring elements stacked in series, said spring mechanism having a load capacity so related to the dead weight of the vehicle that the spring mechanism will be preloaded by said dead weight to a stage of deflection within the low rate range of said spring elements whereby to provide a softly cushioned ride over surfaces that are slightly rough coupled with stiffened resistance to wheel deflection in traveling over larger obstructions.

3. In a land vehicle spring suspension, in combination with means for receiving the load of a vehicle and means for transmitting such load to the vehicle wheels, spring mechanism interposed between said means, comprising a plurality of conical washer-type spring elements stacked in series, said spring mechanism having a load capacity so related to the dead weight of the vehicle that the spring mechanism will be preloaded by said dead weight to a stage of deflection within the low rate range of said spring elements whereby to provide a softly cushioned ride over surfaces that are slightly rough coupled with stiffened resistance to wheel deflection in traveling over larger obstructions.

4. In a land vehicle spring suspension, in combination with means for receiving the load of a vehicle and means for transmitting such load to the vehicle wheels, spring mechanism interposed between said means, comprising a plurality of dished washer-type spring elements stacked in series, said spring mechanism having a load capacity so related to the dead weight of the vehicle that the spring mechanism will be preloaded by said dead weight to a stage of deflection within the low rate range of said spring elements whereby to provide a softly cushioned ride over surfaces that are slightly rough coupled with stiffened resistance to wheel deflection in traveling over larger obstructions.

5. In a land vehicle spring suspension, in combination with means for receiving the load of a vehicle and means for transmitting such load to the vehicle wheels, spring mechanism interposed between said means, comprising a plurality of conical washer-type spring elements stacked in series in pairs of elements inverted relative to each other with adjacent inner peripheries in thrust transmitting relation to each other and adjacent outer peripheries likewise in thrust transmitting engagement with each other, said spring mechanism having a load capacity so related to the dead weight of the vehicle that the spring mechanism will be preloaded by said dead weight to a stage of deflection within the low rate range of said spring elements whereby to provide a softly cushioned ride over surfaces that are slightly rough coupled with stiffened resistance to wheel deflection in traveling over larger obstructions.

6. A land vehicle spring suspension as defined in claim 5, including shouldered washers interposed between the elements of respective pairs of spring elements.

RICHARD L. SMIRL.